(12) United States Patent
Troxler

(10) Patent No.: US 10,663,082 B2
(45) Date of Patent: May 26, 2020

(54) SEALING SYSTEM OF A DEVICE FOR ALLOWING THE PASSAGE OF A MEDIUM, IN PARTICULAR IN THE HIGH PRESSURE RANGE

(71) Applicant: ALLFI AG, Stans (CH)

(72) Inventor: Beat Troxler, Rain (CH)

(73) Assignee: ALLFI AG, Stans (CH)

( * ) Notice: Subject to any disclaimer, the term of this patent is extended or adjusted under 35 U.S.C. 154(b) by 49 days.

(21) Appl. No.: 15/871,664

(22) Filed: Jan. 15, 2018

(65) Prior Publication Data
US 2018/0238468 A1 Aug. 23, 2018

(30) Foreign Application Priority Data

Feb. 23, 2017 (EP) ..................................... 17157634

(51) Int. Cl.
| | |
|---|---|
| *F16K 41/06* | (2006.01) |
| *F16K 11/02* | (2006.01) |
| *F16K 41/04* | (2006.01) |
| *F16J 15/18* | (2006.01) |

(52) U.S. Cl.
CPC ............ *F16K 41/063* (2013.01); *F16J 15/18* (2013.01); *F16K 11/025* (2013.01); *F16K 41/04* (2013.01)

(58) Field of Classification Search
CPC ...... F16K 41/063; F16K 41/04; F16K 11/025; F16K 41/02–086; F16J 15/18
USPC ........................................................ 251/214
See application file for complete search history.

(56) References Cited

U.S. PATENT DOCUMENTS

| | | | | |
|---|---|---|---|---|
| 3,300,225 A | * | 1/1967 | Shepler | F16J 15/166 277/584 |
| 3,877,707 A | * | 4/1975 | Syvakari | F16J 15/24 277/587 |
| 4,356,997 A | * | 11/1982 | Beffano | E21B 34/02 138/44 |
| 4,451,047 A | * | 5/1984 | Herd | F16J 15/183 251/214 |
| 4,556,196 A | * | 12/1985 | Nimberger | F16K 41/04 251/214 |
| 6,076,831 A | * | 6/2000 | Pfannenschmidt | F16K 5/0694 251/214 |
| 6,162,031 A | * | 12/2000 | Tremoulet, Jr. | F04B 53/164 277/584 |
| 6,802,541 B2 | * | 10/2004 | Hopinks | F04B 53/16 285/334.1 |
| 7,247,006 B2 | * | 7/2007 | Hopkins | F04B 53/16 417/415 |
| 7,568,424 B2 | * | 8/2009 | Hopkins | F04B 53/02 92/165 R |

(Continued)

*Primary Examiner* — John Bastianelli
(74) *Attorney, Agent, or Firm* — Brian Roffe

(57) ABSTRACT

Sealing system of a device for allowing the passage of a medium, in particular in the high pressure range, is provided with a housing that has a bore hole, a component mounted within the housing such as to oscillate and/or rotate and with a pressure chamber formed within the bore hole. A sealing element surrounding the component adjoins this pressure chamber which can be charged with the medium. An additional metal seal is formed here by the housing and a pressure disc surrounding the component. The outer region is thus tightly closed after the sealing element. In this way, the sealing element is completely tightly encapsulated on the outside.

15 Claims, 2 Drawing Sheets

(56) References Cited

U.S. PATENT DOCUMENTS

| | | | | |
|---|---|---|---|---|
| 7,730,905 B2* | 6/2010 | Suzuki | ............... | F17C 13/04 |
| | | | | 137/613 |
| 2014/0015202 A1* | 1/2014 | Chacko | ............ | F04B 1/0408 |
| | | | | 277/500 |
| 2015/0053281 A1* | 2/2015 | Haldorsen | ........... | C23C 16/26 |
| | | | | 137/375 |
| 2015/0090916 A1* | 4/2015 | Zollinger | .......... | F16K 5/0694 |
| | | | | 251/214 |

* cited by examiner

SEALING SYSTEM OF A DEVICE FOR ALLOWING THE PASSAGE OF A MEDIUM, IN PARTICULAR IN THE HIGH PRESSURE RANGE

FIELD OF THE INVENTION

The invention relates to a sealing system of a device for allowing the passage of a medium, in particular in the high pressure range.

BACKGROUND OF THE INVENTION

Such sealing systems are suitable for devices, such as liquid cutting heads, high pressure valves, swivel joints, pumps or the like, which work with a medium at a pressure of, in particular, several 1000 bar. A typical area of application are devices for cutting objects with a jet of water provided with high pressure.

The moveable components in such devices, such as for example the valve needle that can be moved to and fro in a cutting head or in a high pressure valve or the respectively rotating shaft pipe in swivel joints, are generally sealed with plastic seals which should have the most leak-free possible sealing effect as well as a small amount of friction and a long lifespan. One attempts here to minimize the extrusion of the relatively soft sealing elements into the sealing gap with appropriate geometries.

In the previously known sealing systems of this type, either glands or sealing elements with O rings are used. In the first case, sealing elements made of plastic, often with a different hardness, are pre-tensioned between two support rings. They offer the advantage of leak-free sealing of the component, but have the disadvantage that even a small amount of wear may result in the system leaking. Therefore, the sealing element must often be re-tensioned, the pre-tensioning generating high friction forces which increase wear and have a negative impact upon the operability of the device.

When using sealing elements with O rings, a soft seal made of plastic is pre-tensioned with an O-ring. The latter serves as an outer seal, the extrusion being restricted with the aid of the support disc on the atmosphere side, while the liquid pressure undertakes the tensioning of the sealing element. With such sealing systems it is advantageous that the seal adjusts itself to a certain degree when it is worn. Moreover, the pre-tensioning of the sealing element is pressure-dependent. However, it is a disadvantage that leak-free sealing is not guaranteed, in particular at high pressures.

OBJECTS AND SUMMARY OF THE INVENTION

The object underlying the invention is to eliminate these disadvantages and to devise a sealing system of the type specified at the start which, by simple means and with the least possible processing effort, ensures the reliable sealing of the component oscillating and/or rotating in the bore hole at the high pressures of the medium that is to be controlled.

According to the invention, this object is achieved by A sealing system of a device for allowing the passage of a medium, in particular in the high pressure range, that includes a housing having a bore hole, a component mounted within the housing to oscillate and/or rotate and with a pressure chamber formed within the bore hole which can be charged with the medium. Adjoining the pressure chamber is at least one sealing element which surrounds the component.

According to the invention, an additional metal seal is formed by the housing and a pressure disc surrounding the component, or alternatively the housing surrounds the component itself. Therefore, the outer region is tightly closed after the sealing element.

In this way, the sealing element is completely tightly encapsulated on the outside.

The sealing point on its external diameter is dispensed with, and its sealing effect is restricted to the less problematic internal diameter between the pressure disc or the housing and the component that oscillates and/or rotates within the latter.

Another considerable advantage is that, due to it being charged with the medium, the sealing element is automatically pre-tensioned by the liquid pressure.

For the purpose of simple processing of the seal, it is advantageous if the metal seal is formed by two opposing sealing surfaces of the housing and of the pressure disc.

In a first version, the invention makes provision such that the opposing sealing surfaces of the housing and of the pressure disc are inclined at an angle of preferably 30° to 60° to the longitudinal axis of the bore hole.

In an alternative version, they are aligned at the angle of approximately 90° perpendicular to the longitudinal axis of the bore hole. Both embodiments are advantageous from the manufacturing point of view. Needless to say however, other inclination angles can also be provided.

Moreover, the invention makes provision such that the sealing element is annular and has conically tapering front sides, the conicity of which is such that the sealing element can be pressed against a correspondingly conically formed support surface of the pressure disc such as to form a seal. Advantageously, the sealing element is produced as a soft seal made of plastic material. Its conical front side then provides the soft seal with a large re-adjustment region which, when worn, is pressed further into the cone by the liquid pressure in order to preserve the sealing function.

The annular sealing element can also be provided with front sides aligned almost perpendicularly to the longitudinal axis of the bore hole. Accordingly, the support surface of the pressure disc is then also aligned perpendicularly to the longitudinal axis of the bore hole.

The sealing system according to the invention is particularly suitable both for high pressure valves for sealing the valve needle of the valve that oscillates in the guide bore hole, and for swivel joints for sealing the rotating shaft pipe of the joint in the guide bore hole.

BRIEF DESCRIPTION OF THE DRAWINGS

In the following, the invention will be explained in more detail with reference to two exemplary embodiments with reference to the drawings. These show as follows.

DETAILED DESCRIPTION OF THE INVENTION

Figure 1:
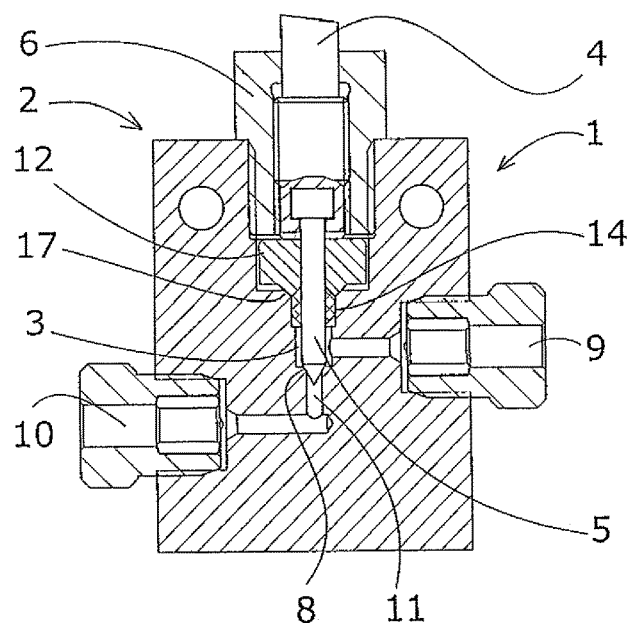
FIG. 1 is a longitudinal section of a sealing system according to the invention of a high pressure valve as a device.
Figure 2:
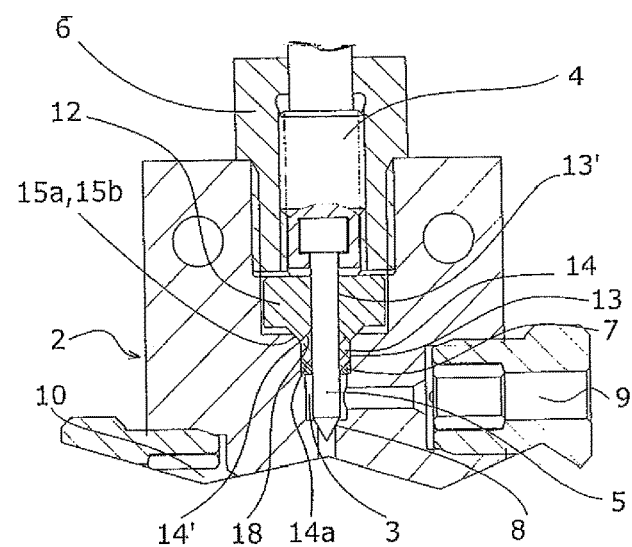
FIG. 2 is a partial longitudinal section of the sealing system of the high pressure valve according to FIG. 1.

FIG. 1 and FIG. 2 show a device of a high pressure valve 1 operating as a spindle valve which can be used, for example, for a cutting head with a water nozzle for cutting materials with a water jet at high pressure.

This high pressure valve 1 comprises a housing 2 with a pressure chamber 3, a spindle nut 6 with a component provided as a valve needle 5, as well as a spindle 4 that can be operated manually or mechanically, for example pneumatically, by means of which the valve needle 5 can be pressed against a valve seat 8 within the housing 2. Moreover, the housing 2 has a water inlet 9 and outlet 10 or vice versa, which, when the valve 1 is open, can be connected to one another via a channel 11. In addition, a pressure disc 12 with a bore hole 13' for guiding the valve needle 5 when closing and opening the high pressure valve 1 is disposed in the housing 2.

In the sealing system according to the invention, a sealing element 14 surrounding the valve needle 5 and in the form of an annular soft seal made of plastic is disposed between the pressure chamber 3 and the pressure disc 12 in the bore hole 13 provided in the housing, and in addition, the outer region 14' of the sealing element 14 is closed tightly by a metal seal 17.

This metal seal 17 is brought about with opposing sealing surfaces 15a, 15b of the housing and of the pressure disc 12 pressed against the housing. Therefore, the sealing point on the external diameter of the sealing element, which is normally required, is dispensed with, and the sealing function of the sealing element 14 is restricted primarily to the less problematic internal diameter of the soft seal.

These sealing surfaces 15a, 15b are advantageously arranged at an angle of inclination of preferably 30° to 60°, for example 45° as shown, to the longitudinal axis of the guide bore hole 13. The sealing element 14 has on its part conically tapering front sides, the conicity of which is formed such that they can be pressed against a correspondingly conically formed support surface 18 of the pressure disc 12 such as to form a seal. In this way, it is possible to re-adjust the seal within a larger range by the liquid pressure pressing further into the cone when the sealing element 14 is worn in order to preserve the sealing function. However, the angle of inclination may also vary within specific limits depending on the individual case.

According to FIG. 2, a reinforcement element, preferably a metal ring 7, is assigned to the sealing element 14 on the front side bordering the pressure chamber 3. The outer region 14' of the sealing element 14 is thus protected against the high flow speed of the fluid flowing through.

Figure 3:
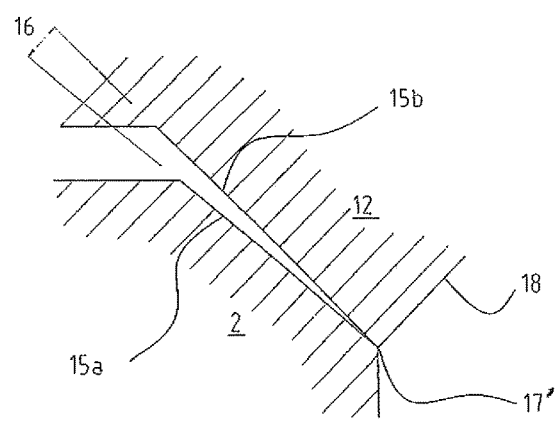
FIG. 3 is a detail of the metal seal according to FIG. 2, shown enlarged.

According to FIG. 3, the angles of inclination of the sealing surfaces 15a, 15b differ from one another by a small angular amount 16 so that the metal seal 17 is produced on the inside in the form of a circular sealing edge 17'. By means of the metal seal produced in this way, plastic deformation of the materials can be achieved at this sealing edge 17', and so the sealing element 14 is completely tightly encapsulated on the outside, and a perfect seal is permanently guaranteed, even at the highest pressures.

Figure 4:
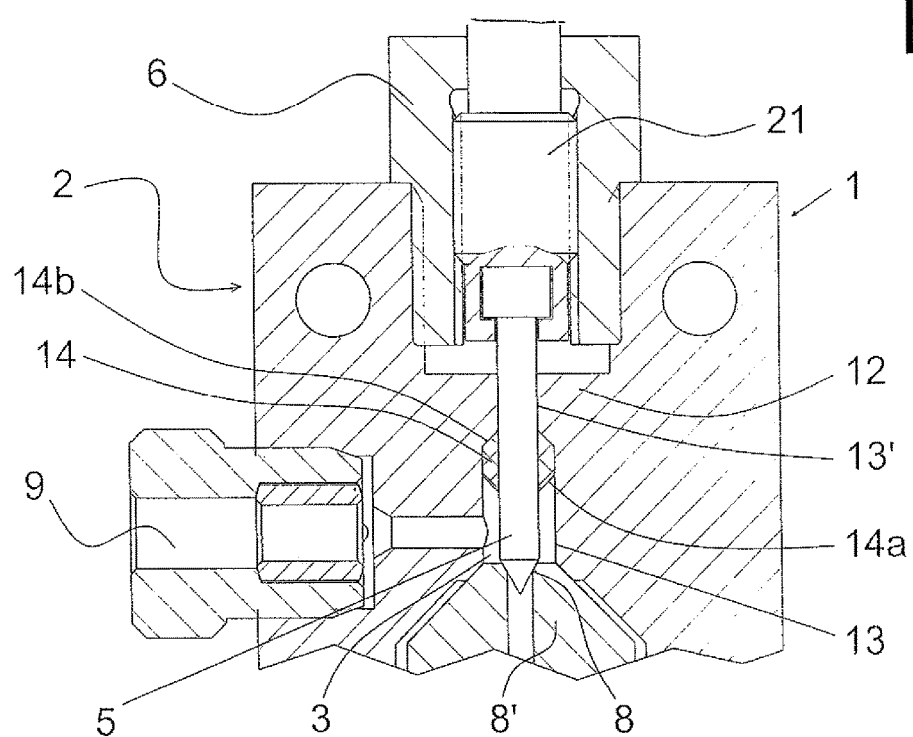
FIG. 4 is a partial longitudinal section of a sealing system according to the invention of a cutting head as a device.

The sealing system according to the invention according to FIG. 4 only differs from that according to FIG. 1 in that in the former, the housing 2 and the pressure disc are more or less produced from a single piece, and consequently the housing 2 itself surrounds and supports this valve needle 5 forming the component. This simplifies the production of these parts, and the function of the spindle nut 6 as a means of supporting and pressing the pressure disc 12 against the counter surface of the housing is also dispensed with. The sealing element 14 is designed annularly with conically tapering front sides 14a, 14b, the outer region on the front side 14b merging into the inner region on the valve needle 5, and so an optimal seal is achieved.

The sealing element 14 is advantageously pressed onto the component 5 in the cylindrical bore hole 13 of the housing 2 both on the outside and on the inside. With its lower front side 14a, it borders the pressure chamber 3 so that it is charged with medium in the operational state. A valve seat block 8' which can be removed from the housing 2 and be exchanged and which comprises the valve seat 8 for the valve needle makes it possible to push the sealing element 14 into the bore hole 13 when the latter is removed. This valve seat block 8' is only partially illustrated.

Figure 5:
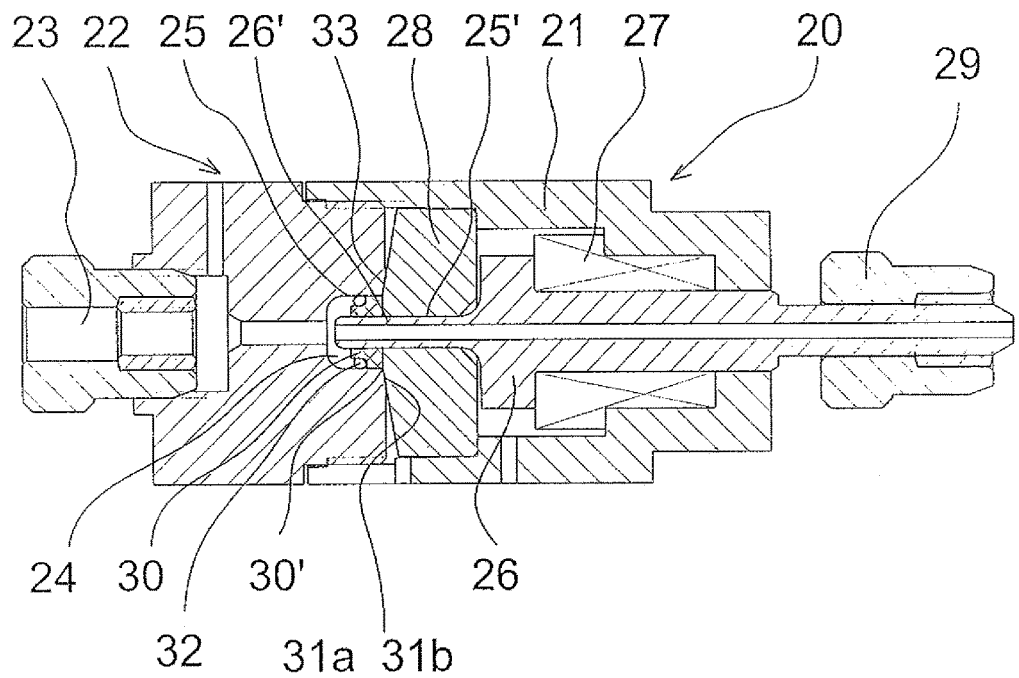
FIG. 5 is a longitudinal section of a sealing system according to the invention of a swivel joint as a device.

The swivel joint 20 shown in FIG. 5 is a component part of a device with a high pressure jet of water, preferably used for cleaning objects or for use with robots for cutting objects, in which frequent rotational movements take place. This swivel joint 20 consists essentially of a multi-part housing 22 with a housing cover 21, a water inlet 29 and a pressure chamber 24, as well as, moreover, a shaft pipe 26 with a ball bearing 27, guided within a bore hole 25', a pressure disc 28, a connector 23 and a sealing element 30 which is inserted in a widened region of the bore hole 25.

According to the invention, an additional metal seal 33 is formed by the housing 22 and this pressure disc 28 that surrounds the sleeve-shaped component 26', and so the outer region 30' is tightly closed after the sealing element 30.

The sealing element 30 is advantageously likewise produced as a soft seal made of plastic material. The metal seal 33 on its part is formed by two opposing sealing surfaces 31a, 31b of the cylindrical housing part and of the pressure disc 28. Advantageously, the angles of inclination of the sealing surfaces 31a, 31b are likewise arranged such that they differ from one another by a small angular amount so that a circular sealing edge is formed on the inside. In addition, the pressure disc 28 is formed conically to the outside.

Unlike the metal seal 17 according to FIG. 1, the sealing surfaces 31a, 31b run at approximately 90° to the longitudinal axis of the bore hole 25. Another difference is that the contact surfaces of the sealing element 30 and of the pressure disc 28 are not conical, but are also inclined approximately perpendicularly to the longitudinal axis of the bore hole 25.

The sealing element 30 is additionally equipped with an 0-ring 32 disposed on the outside as an auxiliary seal in order to alternatively form an outer seal in addition to the metal seal.

The sleeve-shaped component 26' of the shaft pipe is advantageously provided with a coating on the outside so that it slides better within the bore hole 25'. Preferably, a PVD- (Plasma Vapor Disposition) or PACVD- (Plasma Assisted Chemical Vapor Deposition) based coating is used.

In principle, the component 5 provided as a valve needle and/or the borehole 13', 25', which guides this respective component, of the pressure disc 12, 28 or of the housing 2 could also be provided with this coating.

The invention is sufficiently displayed by the exemplary embodiments described above. However, it could, needless to say, also be explained by further versions, such as for example one for sealing the piston of a high pressure pump in which a piston that can be moved to and fro is provided as the component.

These sealing systems according to the invention are particularly suitable for moving components which have small diameters of only a few millimetres and must work with media which are allowed to pass through at a particularly high pressure of a several thousands bar. In practice, the sealing system has proven its worth, in particular at pressures of over 4000 bar. It can be charged with pressures over 6200 bar, and could theoretically be charged to over 10,000 bar.

The invention claimed is:

1. A sealing system of a device for allowing passage of a medium, comprising:
   a housing having a bore hole defined by a surface, and an annular pressure chamber formed within the bore hole which is chargeable with the medium,
   a component mounted within the housing to oscillate and/or rotate, the surface of the housing defining the bore hole and the component defining the pressure chamber around the component and between an outer surface of the component and the surface of the housing defining the bore hole, and
   a sealing element which surrounds a portion of the component and defines part of the pressure chamber, the sealing element having an inner surface in contact with the outer surface of the component at an end of the pressure chamber,
   wherein a metal seal is formed by the housing and a pressure disc surrounding the component, and so an outer region of the sealing element is tightly closed by the metal seal, and
   wherein the metal seal is formed by two opposing sealing surfaces of the housing and of the pressure disc, an angle of inclination of the opposing sealing surfaces differing from one another by a small angular amount, the opposing sealing surfaces forming a circular sealing edge at an inside edge alongside the bore hole and angling apart from one another in a direction outward from the bore hole.

2. The sealing system according to claim 1, wherein the bore hole is cylindrical and the sealing element is pressed into the cylindrical bore hole of the housing and borders the pressure chamber on a front side so that the pressure chamber is charged with medium in the operational state.

3. The sealing system according to claim 1, wherein the sealing element is formed annularly with conically tapering sides, the conicity of the sealing element is such that the sealing element is operationally pressed against a correspondingly conically formed support surface of the pressure disc to form a seal.

4. The sealing system according to claim 1, wherein the sealing element is formed annularly with sides aligned perpendicularly to the longitudinal axis of the bore hole and is operationally pressed against a support surface of the pressure disc that is inclined perpendicularly to a longitudinal axis of the bore hole to form a seal.

5. The sealing system according to claim 1, wherein the sealing element is produced as a soft seal made of plastic material.

6. The sealing system according to claim 1, wherein the opposing sealing surfaces of the metal seal are inclined at an angle of 30° to 60° to a longitudinal axis of the bore hole.

7. The sealing system according to claim 1, further comprising a reinforcement element on a front side of the sealing element bordering the pressure chamber so that an outer region of the sealing element is protected from flow of the medium.

8. The sealing system according to claim 7, wherein the reinforcement element comprises a metal ring.

9. The sealing system according to claim 1, wherein the moveably mounted component and/or the bore hole of the pressure disc or of the housing that guides the component is/are provided with a coating.

10. The sealing system according to claim 9, wherein a PVD-Plasma Vapor Disposition) or PACVD- (Plasma Assisted Chemical Vapor Disposition) based coating is used.

11. The sealing system according to claim 1, wherein the sealing system of the device is configured to allow the passage of a medium in a high pressure range, the housing further including a first flow passage which communicates with the bore hole through an opening in the surface of the housing defining the bore hole, and a second flow passage which communicates with the bore hole, the device having an open state in which the component does not prevent the first and second flow passages from being in communication with one another to allow flow of the medium therebetween and a closed state in which the component prevents the first and second flow passages from being in communication with one another to thereby prevent flow of the medium therebetween, and the pressure chamber being between the first and second flow passages and in flow communication with both the first and second flow passages when the device is in the open state.

12. The sealing system according to claim 1, wherein the housing further includes a first flow passage which communicates with the bore hole through an opening in the surface of the housing defining the bore hole, and a second flow passage which communicates with the bore hole, the pressure chamber communicating with the opening in the surface defining the bore hole and being defined in a longitudinal direction of the component between the sealing element and an opening of the bore hole communicating with the second flow passage, the device having an open state in which the component does not prevent the first and second flow passages from being in communication with one another to allow flow of the medium therebetween and a closed state in which the component prevents the first and second flow passages from being in communication with one another to thereby prevent flow of the medium therebetween.

13. The sealing system according to claim 1, wherein the sealing element is around the component and inward of the surface of the housing defining the bore hole such that an outer surface of the sealing element is in contact with the surface of the housing defining the bore hole and the surface of the housing defining the bore hole is not in contact with the component at an area where the sealing element is present.

14. The sealing system according to claim 1, wherein the housing further includes a first flow passage which communicates with the bore hole through an opening in the surface of the housing defining the bore hole, and a second flow passage which communicates with the bore hole, the device having an open state in which the component does not prevent the first and second flow passages from being in communication with one another to allow flow of the medium therebetween and a closed state in which the component prevents the first and second flow passages from being in communication with one another to thereby prevent flow of the medium therebetween, the sealing element defining the pressure chamber when the device is in the open and closed states and being situated apart from the opening in the surface of the housing defining the bore hole such that the opening in the surface of the housing defining the bore hole is in communication with the pressure chamber.

15. The sealing system according to claim 1, wherein the sealing element is at the end of the pressure chamber more proximate the metal seal.

* * * * *